Figure 1:
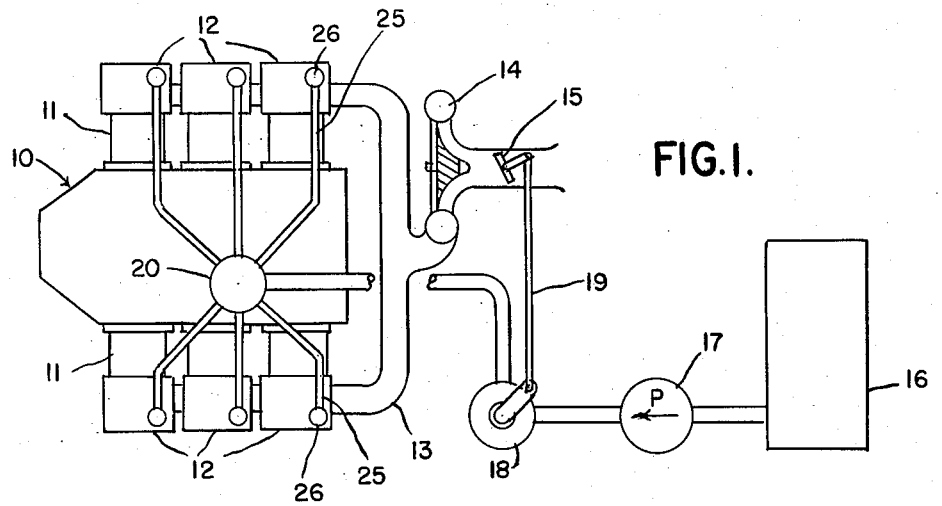

Nov. 17, 1959     R. J. POWELL ET AL     2,913,233

FUEL INJECTOR

Filed Jan. 16, 1957

*INVENTORS*
ROBERT J. POWELL
BY JAMES E. CHAMPION

ATTORNEYS

United States Patent Office 2,913,233
Patented Nov. 17, 1959

2,913,233

FUEL INJECTOR

Robert J. Powell and James E. Champion, Muskegon, Mich., assignors to Continental Motors Corporation, Muskegon, Mich., a corporation of Virginia Application January 16, 1957, Serial No. 634,537

2 Claims. (Cl. 261—64)

Our invention relates to fuel injection systems for internal combustion engines and more particularly to a fuel injector nozzle applicable with supercharged internal combustion engines having continuous flow fuel injection systems.

In the use of continuous flow fuel injection systems wherein the injector nozzles inject fuel directly into the air intake of the cylinders, one difficulty encountered is the fact that during engine idling operation, the higher manifold vacuum tends to draw fuel from the pipes leading to the nozzle, resulting in an overrich idling mixture. Then, upon advancing the throttle, a lag in engine response occurs due to the fact that fuel is not immediately available at sufficient pressure.

Another phenomenon that occurs in the fuel lines is that the fuel has a tendency to vaporize or boil off due to increased manifold vacuum. This too results in a lag in engine response before liquid fuel is available at full pressure when the throttle is advanced.

It has been found that these problems may be solved without resorting to complex controls and nozzle shut-off mechanisms by providing a small air inlet to the fuel discharge passage of the nozzle so that air instead of fuel will be drawn through during idling and the aforesaid boiling effect will be minimized. The air which may be mixed with fuel during higher speed due to the air inlet opening will be negligible. The air which is drawn in, by a jet siphon effect produced by the particular nozzle construction augments fuel vaporization in the nozzle prior to injection into the manifold.

However, using such a system with supercharged engines, it will be seen that when manifold pressure exceeds atmospheric pressure, fuel and air are apt to be ejected from the air inlet opening, particularly during the periods when the cylinder intake valve is closed.

An object of our present invention is to improve engine performance by providing a vented fuel injection nozzle.

Another object of the invention is to improve fuel injection operation in supercharged internal combustion engines by providing a check valved air inlet to the fuel discharge of the fuel injection nozzle.

A further object of the invention is to provide a simplified fuel injection system for supercharged internal combustion engines by constructing a fuel injection nozzle having a fuel jet automatically vented to atmosphere only during engine idling operation.

A still further object of the invention is to provide a means for augmenting vaporization of fuel at lower manifold pressures in a supercharged internal combustion engine by providing a fuel injection nozzle having a fuel jet vented to atmosphere for reducing a jet siphon effect and operable to close the vent at higher supercharged manifold pressures.

For a more complete understanding of our invention, reference may be had to the accompanying drawing illustrating a preferred embodiment of the invention in which like characters refer to like parts throughout the several views and in which Fig. 1 is a diagrammatic view of a preferred fuel injection system embodying the present invention.

Figure 2:
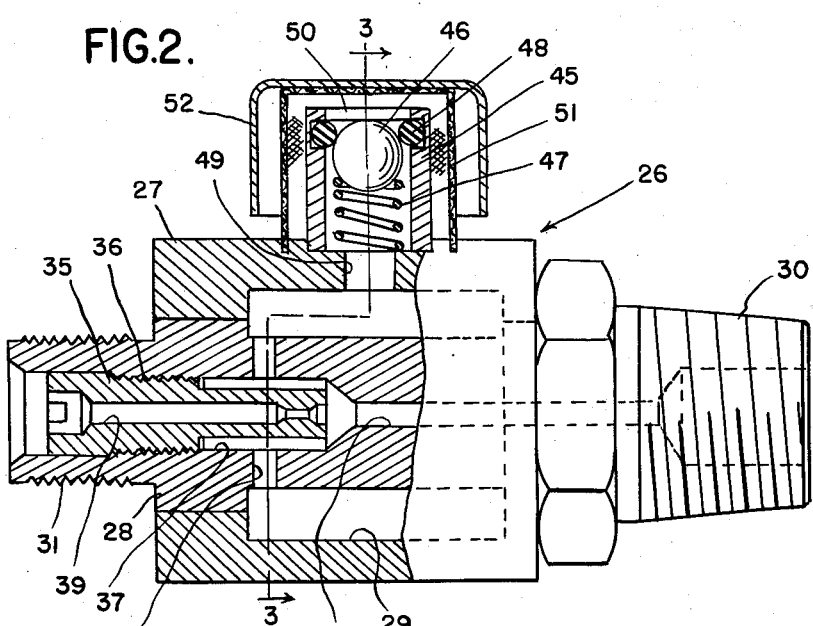
Figure 3:
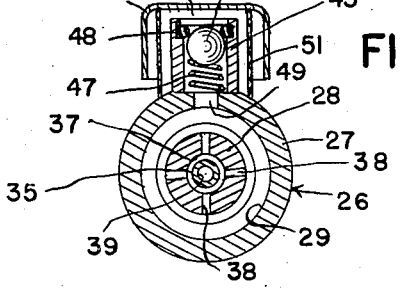

Fig. 2 is an enlarged view, partly in section of the fuel injection nozzle incorporated in the injection system of Fig. 1, and Fig. 3 is a cross-sectional view of the injection nozzle taken substantially on the line 3—3 of Fig. 2.

In Fig. 1, a preferred type of continuous flow, multiple discharge fuel injection system is diagrammatically illustrated for use with a supercharged multi-cylinder internal combustion engine 10 having engine cylinders 11. Each cylinder has an air intake structure 12 to which induction air is supplied through an air intake manifold structure 13 provided with a conventional supercharger 14 and an adjustable air intake throttle valve 15.

The fuel injection system comprises preferably a fuel tank 16, a positive displacement fuel pump 17, and a fuel metering valve structure 18 which is preferably connected to the throttle valve 15 by linkage 19 or other means so that when the throttle valve 15 is advanced or opened, the metering valve 18 opens correspondingly to port fuel to a fuel delivery manifold 20.

Individual fuel supply conduits 25 lead from the fuel delivery manifold 20 to individual fuel injection nozzles 26 opening into the individual air intake structures 12 of the engine cylinders 11.

Figs. 2 and 3 illustrate a preferred construction of the fuel injection nozzles 26 as comprising a casing structure 27 having a core structure 28 defining an annular air chamber 29. A threaded discharge tip assembly 30 is secured at one end of the casing structure 27 for assembly to the air intake structure 12. The core structure 28 extends from the opposite end of the casing structure 27 and is threaded as at 31 for connection with the fuel delivery conduits 25. The core structure 28 has a stepped bore 32 comprising a fuel discharge passage.

A fuel jet member 35 is threaded as at 36 into the larger section of the bore 32 and provides an annular compartment 37 which communicates by means of radially extending passages 38 in the core structure 28 with the air chamber 29.

A jet type fuel intake passage 39 is provided in the fuel jet member 35, adapted to inject fuel into the discharge passage 32, the air passages 38 being upstream of the injection location as illustrated in Fig. 2.

A check valve assembly 45 having a ball check element 46 held by a relatively weak spring 47 against an annular sealing seat 48 is secured to the casing structure 27 and has its outlet communicating with the air chamber 29 by means of a passage or port 49, and its inlet 50 communicates with the atmosphere. An annular screen 51 and dust shield 52 are mounted on the casing 27 to provide a tortuous passage for air having access to the check valve inlet 50.

During engine operation, fuel will normally be injected through the jet passage 39 into the discharge passage 32 and thence into the air intake 12 of the cylinder 11. If manifold pressure is below atmospheric pressure, as during engine idle or low speed operation, or when the supercharger is inoperative, the check valve 45 will be open and air will be drawn into the discharge passage 32 at substantially atmospheric pressure, since the total cross sectional area of the passages 38 is preferably about four times the cross-sectional area of the passage 32 and the air inlet more than supplies the air requirements of the passage 32. Thus the region at the junction of the fuel jet inlet passage 39 and the discharge passage 32 is at atmospheric pressure so as to prevent excessive fuel from being sucked out of the fuel inlet 39 and the delivery conduit 25.

Also at these speeds, fuel injected from the restricted end of the jet passage 39 into the passage 32 creates a jet siphon effect, sucking air into the passage 32 and the cooperating construction and operation of the jet passage 39 a fuel atomization is produced in the passage 32 prior to injection into the cylinder 11, thereby assisting final fuel vaporization.

It should be noted that the cross-sectional area of the passage 32 is preferably about four times the cross-sectional area of the smallest part of the duct 39, and the length of the passage 32 is at least six to twelve times its diameter. Also, the cross-sectional area of the passage 32 should preferably be substantially less than that which could supply all of the idle air requirements of the engine, so as not to upset the normal functioning of the air induction system at lower manifold pressures.

With the supercharger 14 in operation, manifold pressure may rise beyond atmospheric pressure, so that the check valve 45 will close, preventing air and/or fuel from being exhausted out of the port 49. The spring 47 is relatively weak so that the position of the ball check 46 is substantially determined by a differential between manifold pressure and atmospheric pressure.

Although we have described but one preferred embodiment of our invention, it will be apparent to one skilled in the art to which the invention pertains that various changes and modifications may be made therein without departing from the spirit of the invention or the scope of the appended claims.

We claim:

1. A fuel injection system for a supercharged internal combustion engine having a cylinder air intake and an air induction system comprising an air intake manifold structure and an intake air supercharger operable to relatively increase manifold pressure above atmospheric pressure at predetermined engine speeds, a fuel conduit conducting fuel under pressure to said air intake manifold closely adjacent to said cylinder air intake, a unitary fuel injection nozzle assembly connecting said fuel conduit to said air intake manifold and comprising a casing having an annular air chamber and an air inlet, a core structure secured in said casing and traversing said air chamber, said core structure having a bore, a fuel jet member secured in said bore and having a tip portion of reduced diameter disposed in said bore and providing an annular air passage communicating with said bore, said jet member provided with an axial fuel duct terminating in a discharge outlet opening into said bore, said bore comprising an outlet openingly communicating with said air manifold, said bore having lateral air passages connecting said annular air chamber with one end of said annular air passage, said fuel jet member constructed and arranged for cooperating with said air passage to siphon air from said air chamber into said discharge outlet when manifold pressure is lower than atmospheric pressure, and check valve means secured to said casing and disposed in said air intake and operable to close said air intake when manifold pressure exceeds atmospheric pressure whereby to prevent fuel and air from being discharged out of said air inlet.

2. A fuel injection system for a supercharged internal combustion engine as in claim 1, wherein said air chamber of the casing is disposed concentrically around the bore in said core structure, and said lateral air passages extend radially outwardly from said annular air passage to said air chamber adjacent to the end portion of said casing adjacent to said fuel conduit and longitudinally spaced from the air intake in said casing and from the point where said annular air passage connects with said bore.

References Cited in the file of this patent
UNITED STATES PATENTS

| | | |
|---|---|---|
| 1,194,297 | Kingston | Aug. 8, 1916 |
| 1,379,474 | Osborne | May 24, 1921 |
| 2,134,182 | Goodrie | Oct. 25, 1938 |
| 2,252,958 | Bicknell | Aug. 19, 1941 |
| 2,488,250 | Williams | Nov. 15, 1949 |
| 2,511,213 | Leslie | June 13, 1950 |